United States Patent
Karpovsky et al.

(10) Patent No.: US 12,505,170 B2
(45) Date of Patent: Dec. 23, 2025

(54) RANDOM STRINGS CLASSIFICATION FOR DETECTING SUSPICIOUS NETWORK ACTIVITIES

(71) Applicant: Microsoft Technology Licensing, LLC., Redmond, WA (US)

(72) Inventors: Andrey Karpovsky, Kiryat Motzkin (IL); Tomer Rotstein, Haifa (IL); Michael Makhlevich, Sderot (IL); Fady Nasereldeen, Daliat el carmel (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 1105 days.

(21) Appl. No.: 17/502,977

(22) Filed: Oct. 15, 2021

(65) Prior Publication Data
US 2023/0123632 A1    Apr. 20, 2023

(51) Int. Cl.
*G06F 21/00* (2013.01)
*G06F 16/955* (2019.01)
(Continued)

(52) U.S. Cl.
CPC ........ *G06F 16/9566* (2019.01); *G06F 18/214* (2023.01); *G06F 21/566* (2013.01); *G06N 20/00* (2019.01); *H04L 63/1425* (2013.01)

(58) Field of Classification Search
CPC .. G06F 16/9566; G06F 18/214; G06F 21/566; G06F 21/554; G06N 20/00; H04L 63/1425; H04L 63/1483
See application file for complete search history.

(56) References Cited

U.S. PATENT DOCUMENTS 10,685,293 B1    6/2020  Heimann et al.
2010/0064368 A1*  3/2010  Stolfo ................ H04L 63/1416
                                                     726/24
(Continued)

FOREIGN PATENT DOCUMENTS

CN        106650449 B    5/2020

OTHER PUBLICATIONS

Jiang, et al., "Multi-resolution Abnormal Trace Detection Using Varied-length N-grams and Automata", In Proceedings of Second International Conference on Autonomic Computing, Jun. 13, 2005, 12 Pages.
(Continued)

*Primary Examiner* — Michael M Lee
(74) *Attorney, Agent, or Firm* — Workman Nydegger

(57) ABSTRACT

A computing system is configured to train a machine-learning model for detecting suspicious network activities based on a training dataset. The training of the machine-learning model may be supervised or unsupervised training. The training dataset includes multiple strings. For each of the multiple strings, the computing system extracts one or more N-grams substrings, where N is a natural number that is equal to or greater than 2. The computing system then determines a probability of each N-grams substring that may occur in a string. When the machine-learning model is executed, it is configured to classify whether a given string contained in network communication is a random string. In response to classifying that the given string is a random string, an alert is generated at a particular computing system to which the network communication is directed.

18 Claims, 9 Drawing Sheets

(51) Int. Cl.
*G06F 18/214* (2023.01)
*G06F 21/56* (2013.01)
*G06N 20/00* (2019.01)
*H04L 9/40* (2022.01)

(56) References Cited

U.S. PATENT DOCUMENTS

| | | | |
|---|---|---|---|
| 2016/0255107 A1* | 9/2016 | Qian | H04L 63/1425 |
| | | | 726/23 |
| 2017/0346827 A1 | 11/2017 | Tyagi | |
| 2018/0173875 A1* | 6/2018 | Lawshae | G06F 40/279 |
| 2018/0293381 A1* | 10/2018 | Tseng | G06N 20/00 |
| 2019/0190938 A1* | 6/2019 | Oba | H04L 43/16 |
| 2019/0236273 A1* | 8/2019 | Saxe | G06F 18/214 |
| 2019/0303796 A1* | 10/2019 | Balasubramanian | G06N 7/01 |
| 2019/0392207 A1* | 12/2019 | Young | G06V 30/274 |
| 2019/0394220 A1* | 12/2019 | Gupta | G06F 18/24 |
| 2020/0279079 A1* | 9/2020 | Indenbom | G06F 40/253 |
| 2021/0319084 A1* | 10/2021 | Abadi | G06F 21/31 |

OTHER PUBLICATIONS

"International Search Report and Written Opinion Issued in PCT Application No. PCT/US22/044306", Mailed Date: Jan. 10, 2023, 12 Pages.

* cited by examiner

RANDOM STRINGS CLASSIFICATION FOR DETECTING SUSPICIOUS NETWORK ACTIVITIES

BACKGROUND

Malicious network activities often involve randomly generated strings (such as application names and attempted requests). For example, once a malicious application's name is known, the malicious application can be added to a blacklist and blocked based on the name, which would trigger the malicious application to change to a new name to avoid such classification. In some cases, the malicious application spins a new name on each operation, and randomly generated strings are often used as the new names. As another example, malicious websites and/or URLs may be created with random names during command and control pipelines or fussy attempts. Security software tracks these malicious websites and URLs and blocks them when a user inadvertently clicks a link directed to such malicious websites or URLs.

Furthermore, brute-force attacks often also involve randomly generated strings (e.g., attempted requests). Brute-force attacks work by trying every possible combination that could make up a valid request and testing it to see if it is a valid request. For example, in a brute-force attack, an attacker may submit many passwords and/or usernames with the hope of eventually guessing correctly. The attacker may systematically check all possible passwords until a match is found. Among all the possible passwords, most of them are random strings that a user would not be likely to choose to use. Servers may be able to detect such attacks based on an unusually high number of requests received in a period of time. When the number of requests is far higher than usual numbers corresponding to normal network traffic, the servers might be able to notify administrators.

However, the existing technologies are generally not capable of analyzing network communications in real time to determine the likelihood of that communication message being suspicious or malicious. Further, the existing technologies also generally cannot make the determination based on short strings. Instead, they often require analyzing whole paragraphs of text to make determinations.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein include a method and/or a computing system for training and using a machine-learning model configured to detect random strings, indicating that suspicious network activities are likely to occur. In some embodiments, the computing system is configured to access a training dataset including a plurality of strings. For each of the plurality of strings, one or more N-grams substrings are extracted, where N is a natural number that is equal to or greater than 2 (but smaller than a length of strings). For each N-grams substring, the computing system is configured to determine an appearance frequency of the N-grams substring in the plurality of strings and determine a probability of the N-grams substring that may occur in a string based on the appearance frequency.

Next, the computing system is configured to train a machine-learning model based on the training dataset and the probability of each N-grams substring. When the machine-learning model is executed, the machine-learning model is configured to classify whether a given string contained in network communication is a random string. In response to classifying that the given string is a random string by the machine-learning model, an alert is generated at a particular computing system, to which the network communication is directed. The alert notifies the computing system or a user of the computing system that a suspicious network activity is likely to occur.

The principles described herein also include a method implemented at a computing system for detecting suspicious network activities based on detections of random strings. The method includes executing a machine-learning model trained based on a training dataset. The training dataset includes a plurality of strings. The method includes receiving, at a particular computing system, a network communication containing at least one string. The method also includes extracting one or more N-grams substrings from the at least one string. A probability of each of the one or more N-grams substrings is then determined based on the machine-learning model. An entropy value for the string is then determined based on the probability of each of the one or more N-grams substrings. In some embodiments, the entropy includes a Shannon's Entropy. In some embodiments, the entropy includes other metrics over n-grams probabilities. When the entropy value is greater than a cut-off value, the at least one string is classified as a random string by the machine-learning model. In response to classifying that the at least one string is a random string, it is determined that a suspicious network activity is likely to occur, and an alert is generated at the particular computing system. The alert notifies the particular computing system or a user of the particular computing system that the suspicious network activity is likely to occur.

The training of the machine-learning model can be supervised training or unsupervised training. In some embodiments, when the training of the machine-learning model is supervised training, the training dataset is a labeled dataset, and each of the plurality of strings in the training dataset is labeled as a known string or a random string. In some embodiments, when the training of the machine-learning model is unsupervised training, frequency of each string can be used to determine the likelihood of the corresponding string being a random string.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Figure 1:
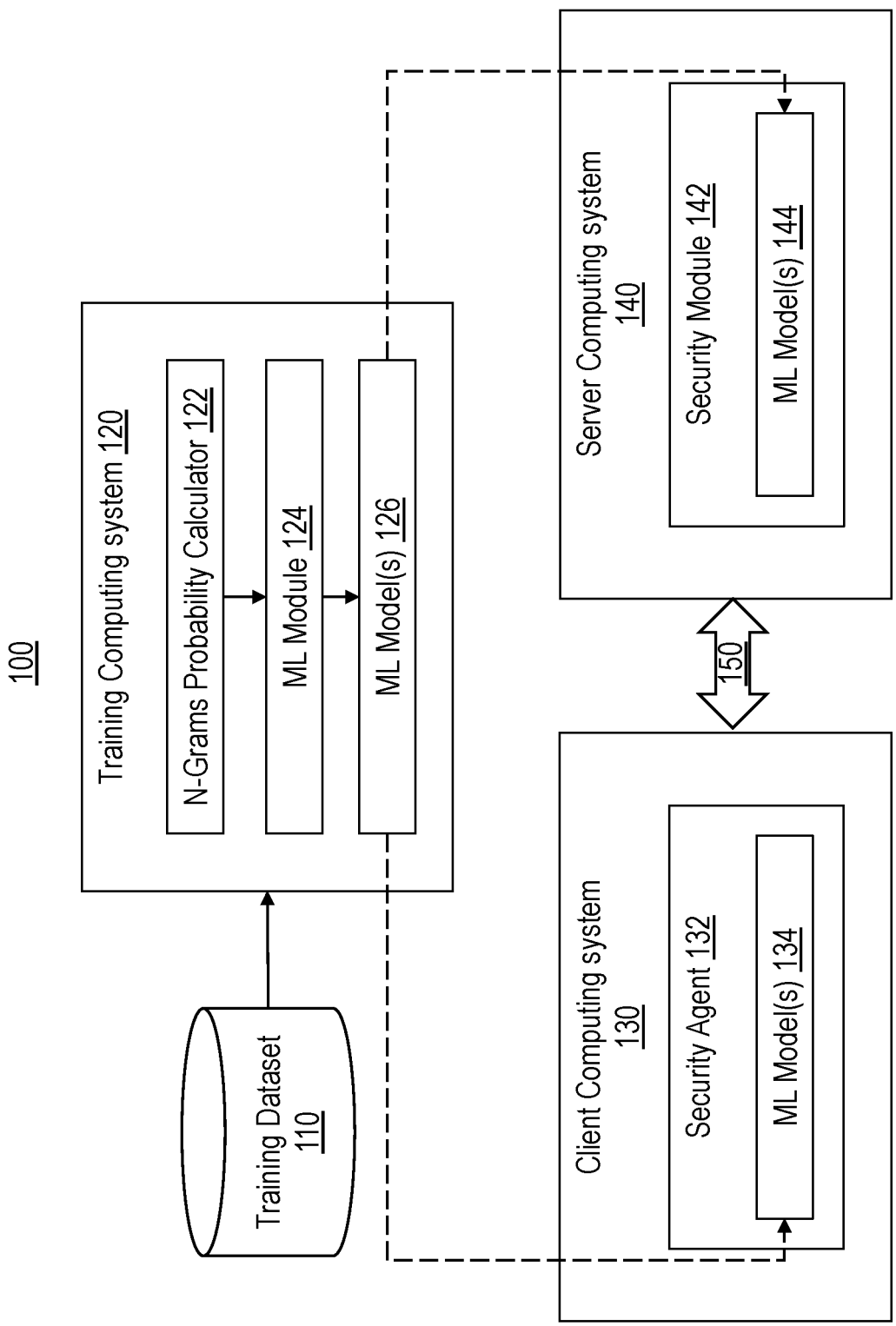
FIG. 1 illustrates a system for training a machine-learning model based on a labeled dataset and using the trained machine-learning model to detect random strings indicating that suspicious activities are likely to occur.

In the security domain, strings may represent names given to tools (such as applications), resources (such as servers, websites), and/or username-password pairs. Normally, names are specifically chosen in a meaningful way, representing the content or purpose of the entity. However, malicious applications often randomly generate strings for evasion purposes. For example, in some cases, once a malicious application's name is known, the malicious application can be blocked based on the name, which would trigger the malicious application to change to a new name. As such, the malicious application needs to change its name frequently, and randomly generated strings are often used as new names. As another example, malicious websites may be created with random names during command and control pipelines or fussy attempts.

Further, a brute-force attack often also involves randomly generated strings (e.g., attempted requests). Brute-force attacks work by trying every possible combination that could make up a valid request and testing it to see if it is a valid request. For example, in a brute-force attack, an attacker may submit many passwords or passphrases with the hope of eventually guessing correctly. The attacker may systematically check all possible passwords until a match is found. Among all the possible passwords, most of them are random strings that a human user would not be likely to use.

Existing technologies include creating a blacklist for tracking newly generated random names of known malicious applications. However, such existing technologies are generally not capable of analyzing a single network communication message in real time to determine the likelihood of that communication message being suspicious or malicious.

The principles described herein solve the above-described problem by providing systems and methods in security domains for classifying strings contained in network communications (e.g., application names, servers names, websites names, usernames, passwords, etc.) as random strings or known strings. In response to classifying that a string is a random string, the classification can be used to detect suspicious activities and/or block the detected suspicious activities to prevent damage. In some embodiments, metadata associated with the source of the detected suspicious activities (such as IP addresses) can also be used to generate a blacklist to block malicious entities.

The classification of random strings or known strings can be done by estimating a probability that a given string is randomly generated. In some embodiments, a cut-off threshold of the probability is selected for binary classification. When a probability is greater than the cut-off threshold, the string is classified as sufficiently random. When a probability is no greater than the cut-off threshold, the string is classified as not sufficiently random.

For example, in some embodiments, the string is obtained from network communications exchanged between a client computing system and a server computing system. In response to determining that the string is a random string, the machine-learning model causes the alert to be generated at the server computing system or the client computing system.

Notably, random string classification may be achieved by parsing the string to multiple substrings and looking up each of the substrings in a representative corpus (such as a dictionary). When each of the substrings does not appear in the corpus, the whole string can be considered random. For example, a string "store" can be parsed into the following substrings: "st", "to", "or", "re", "sto", "tor", "ore", "stor", "tore", and "store". Each of the substrings may be compared to each word in a dictionary to try to find a match. Since at least one match is found, it is determined that the string "store" is probably not a random string. However, such embodiments require greedy lookup in a large corpus. When the detection is required to be performed in near real-time, a large amount of resources (such as a large in-memory capacity) is required to achieve the required timeliness. In many cases, the requirement of resources is too demanding to be practical for most server computing systems or client computing systems to achieve near real-time performance using such a dictionary-based random string classification method.

The principles described herein solve the above-described problem by using machine learning to train a "dictionary-less" N-grams model from a large corpus. Different machine-learning techniques can be implemented to train the N-grams model, including (but not limited to) logistic regression, k-nearest neighbors, decision trees, support vector machine, Naïve Bayes, random forest, gradient boosting, neural networks, etc. In some embodiments, the training may be performed offline. The N-grams model is much smaller than the large corpus (e.g., a dictionary) and can then be loaded on a local machine, and the classification can be performed within a single pass of each string. As such, when limited in-memory capacity is available, it is advantageous to use the machine-learning N-grams model to generate near real-time results.

FIG. 1 illustrates an example of a system 100, including a training computing system 120, a client computing system 130, and a server computing system 140. The training computing system 120 is configured to access and analyze a training dataset 110. The labeled dataset 110 includes a plurality of strings. The training of the machine-learning model can be supervised training or unsupervised training. In some embodiments, when the training of the machine-learning model is supervised training, the training dataset is a labeled dataset, and each of the plurality of strings in the training dataset is labeled as a known string or a random string. In some embodiments, when the training of the machine-learning model is unsupervised training, frequency of each string can be used to determine the likelihood of the corresponding string being a random string.

The training computing system 120 includes an N-grams probability calculator 122 and a machine-learning module 124. The N-grams probability calculator 122 is configured to extract one or more N-grams substrings from each of the plurality of strings in the training dataset 110 and determine a probability of each N-grams substring that is likely to be in a string. The machine-learning module 124 is configured to train a machine-learning model 126 based on the probabilities of all the N-grams and the plurality of strings in the training dataset 110. The trained machine-learning model 126 is configured to compute an entropy value for each given string, and determine whether the given string is likely to be a random string based on the computed entropy value. The entropy value indicates the randomness of the string. In some embodiments, the trained machine-learning model 126 is configured to determine a normalized probability based on the entropy value, indicating the likelihood of the string being a random string. In some embodiments, the trained machine-learning model 126 is configured to generate a binary result, such that when the entropy value is greater than a cut-off value, the given string is classified as a random string.

Once the machine-learning model 126 is trained, the machine-learning model 126 may be deployed onto a server computing system 130 and/or a client computing system 130. In some embodiments, the machine-learning model 134, 144 is deployed onto a security agent 132 of the client computing system 130 and/or a security module 142 of the server computing system 140. The security agent 132 and/or the security module 142 are configured to monitor network communications directed thereto. For example, the security agent 132 is configured to monitor network communications 150 between (1) the client computing system 130 and (2) the server computing system 140 and/or any other server computing systems (not shown). As another example, the security module 142 is configured to monitor network communications 150 between (1) the server computing system 140 and (2) the client computing system 130 and/or any other client computing systems (not shown). The network communications 150 often contain one or more strings. The machine-learning model 134, 144 is configured to classify whether strings contained in the incoming network communications 150 are random strings. In response to classifying that the incoming network communications 150 contain random strings, the machine-learning model 134, 144 causes the security agent 132, or the security module 142 to generate an alert, notifying the client computing system 130 or the server computing system 140 that suspicious activities are likely to occur.

In some embodiments, the metadata associated with the sources of the suspicious activities are logged, and at least some of the sources of the suspicious activities may be added to a blacklist. For example, in some embodiments, when a source was detected to be repeatedly sending random strings to one or more server computing systems 140 or one or more client computing systems 130, the source may be added to the blacklist.

Note, even though system 100 shows three different computing systems 120, 130, 140, it is not necessary that there are three computing systems in system 100. In some embodiments, there may be multiple server computing systems 140 configured to receive the machine-learning model 126 from the training computing system 120. In some embodiments, there may be multiple client computing systems 130 configured to receive the machine-learning model 126 from the training computing system 120. In some embodiments, the training computing system 120 and the server computing system 140 are a same computing system. In some embodiment, the training computing system 120 and the client computing system 130 are a same computing system. The training dataset may be obtained based on previous network attacks that occurred at the server computing system or the client computing system.

Further, even though a machine-learning model 134, 144 is shown in each of the client computing system 130 and server computing system 140, it is not necessary that both the client computing system 130 and the server computing system 140 receive a machine-learning model 134, 144. In some embodiments, the machine-learning model 134 is built for a security agent 132 of a client computing system 130, but not a server computing system 140. In some embodiments, the machine-learning model 144 is built for a security module 142 of a server computing system 140, but not a client computing system 130. In some embodiments, different machine-learning models are built for different computing systems, depending on the need and/or available resources of the computing systems or the applications. For example, the client computing system 130 and the server computing system 140 may be configured to receive and implement different machine-learning models.

For example, in some embodiments, the server computing system 140 may be an SQL server configured to control data storage, processing, and security. The machine-learning model 144 received by the SQL server may be trained using a log of previously received commands and queries. The SQL server 140 receives commands and queries from many different client computing systems. The commands and queries contain strings that can be analyzed by the machine-learning model 144. In response to classifying (by the machine-learning model 144) that a command or query contains random strings, the security module 142 may be triggered to generate an alert and/or block the command or query.

In some embodiments, the server computing system 140 may be an identity server configured to authenticate users via username-password pairs. The machine learning model 144 received by the server computing system 140 may be trained using username-password pairs. In response to receiving a username-password pair from a client computing system, the machine learning model 144 is configured to classify the received username-password as a known string or a random string. In response to classifying (by the machine-learning model 144) that a username-password pair contain random strings, the security module 142 may be triggered to generate an alert and/or block the login attempt.

As another example, in some embodiments, the client computing system 130 may have a browser, and the security agent 132 is configured to analyze URLs or other contents received from the browser. The machine-learning model 134 received by the client computing system 130 may be trained based on known URLs, including legitimate URLs and malicious URLs. When a URL is received by the browser or contained in a webpage loaded in the browser, the machine-learning model 134 is configured to classify whether the one or more strings contained in the URLs and other contents received from the browser are random strings. In response to classifying (by the machine-learning model 134) that a URL or a webpage contains random strings, the security agent 132 or the browser may be configured to generate an alert and/or block the URL or the webpage.

As another example, the server computing system 140 may be an email server or a messenger server, and/or the client computing system 130 may include an email agent or a messenger agent. The email/messenger server and/or the email/messenger agent may use the machine-learning model 134 or 144 to classify emails or messages as containing random strings or not. In response to classifying an email or a message as containing random strings, the security agent 132 or security module 142 of the email/messenger agent or the email/messenger server is triggered to generate an alert or automatically filter the email message to a separate folder (e.g., a spam folder), or block the content in the email or the message.

Figure 2:
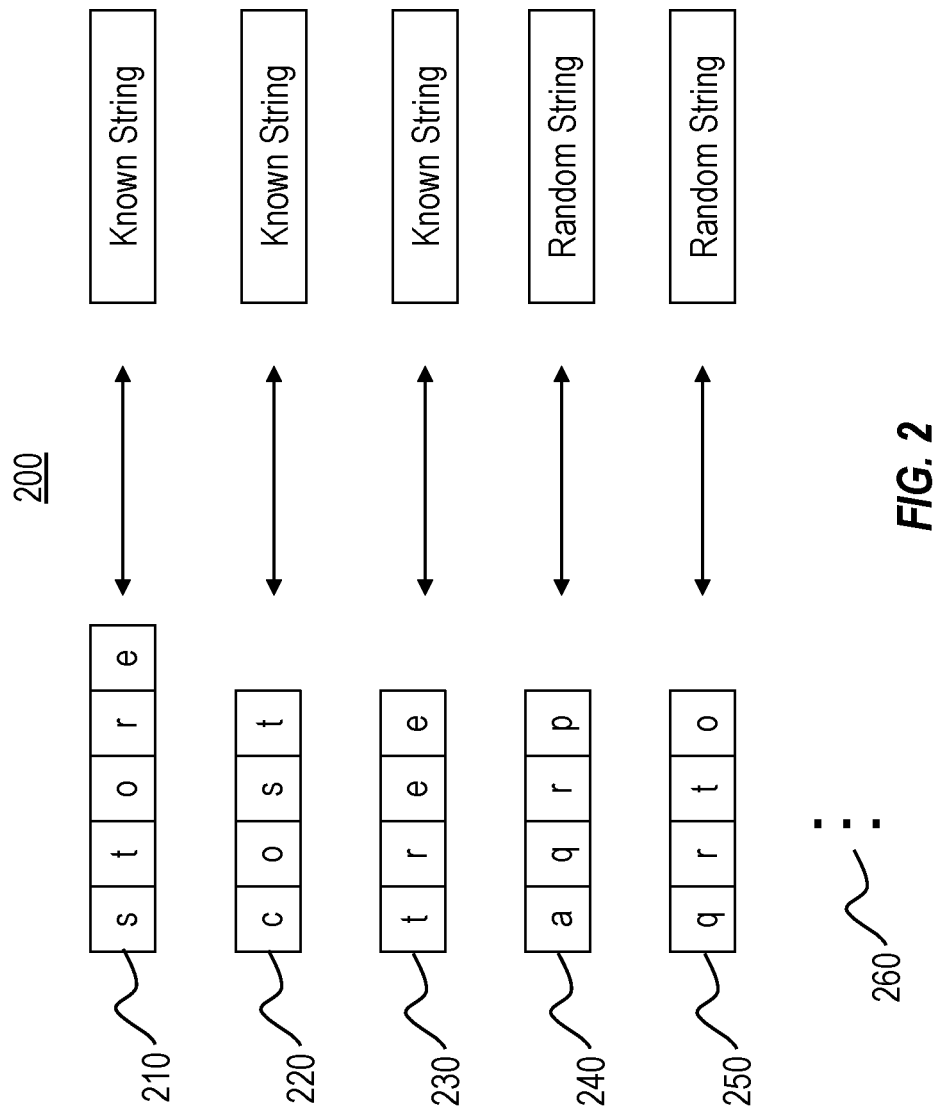
FIG. 2 illustrates an example labeled dataset including a plurality of strings, each of which is labeled as a known string or a random string.

FIG. 2 illustrates an example of a labeled dataset 200, which corresponds to the labeled dataset 110 of FIG. 1. The labeled dataset 200 includes a plurality of strings 210, 220, 230, 240, 250, each of which is labeled as a known string or a random string. The ellipsis 260 represents that there may be any number of strings in the labeled dataset 220. For example, in some embodiments, the labeled dataset 200 includes a list of application names, some of which are known to be legitimate application names, and some of which are known to be malicious or random application names. Such labeling may be performed during known malicious attacks. In some embodiments, the plurality of strings contain only the application names that are certain characters long, such as 6 to 16 characters long.

As illustrated in FIG. 2, the strings "store" 210, "cost" 220, and "tree" 230 are labeled as known strings, and the strings "aqrp" and "qrto" are labeled as unknown strings. The plurality of strings 210, 220, 230, 240, 250 are then processed by a training computing system 210 to train a machine-learning model 126. Processing the plurality of strings 210, 220, 230, 240, 250 includes extracting one or more N-grams substrings from each of the plurality of strings 210, 220, 230, 240, 250, where N is a natural number that is equal to or greater than 2. For example, when N=2, the substrings are 2-grams substrings.

Figure 3:
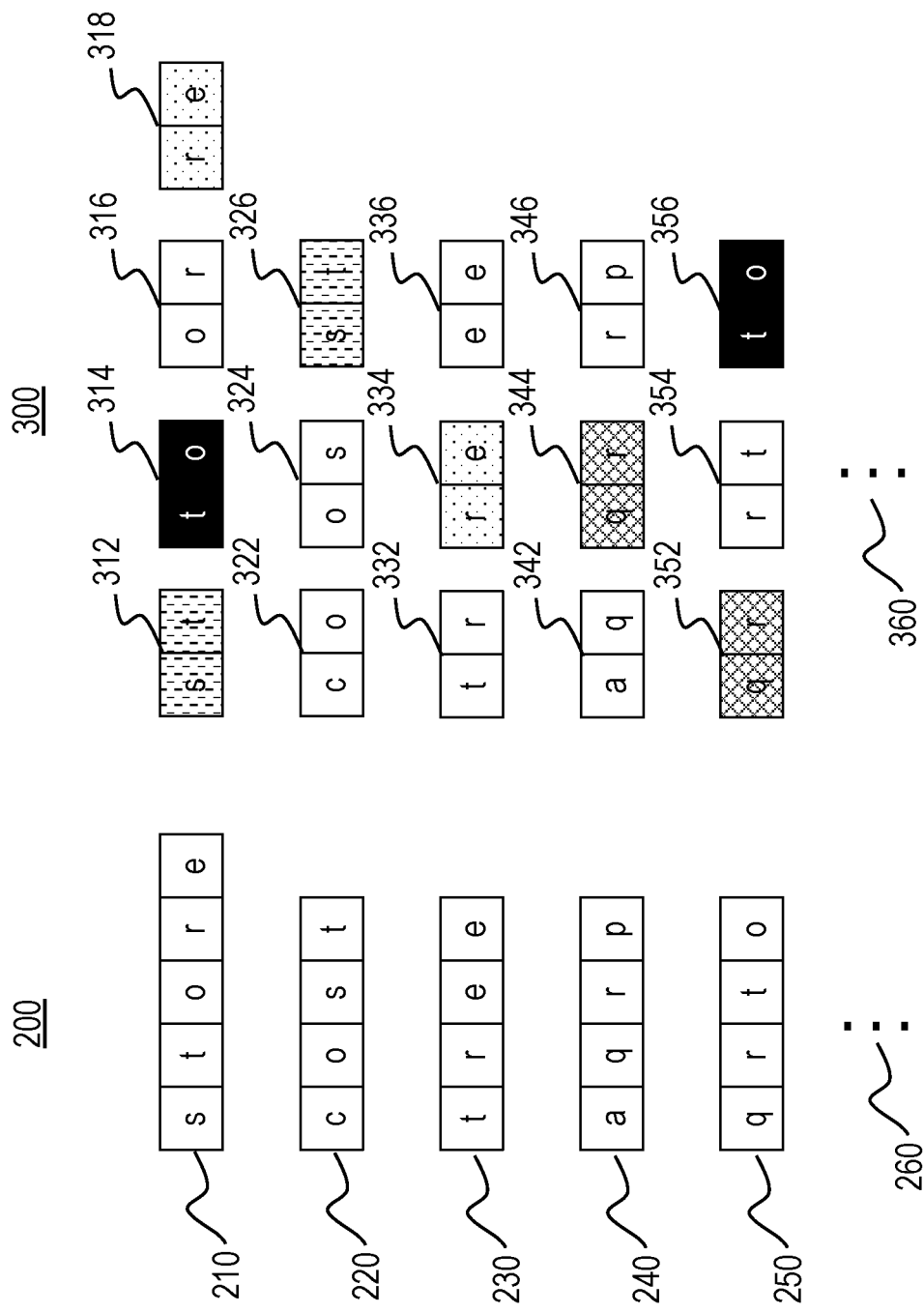
FIG. 3 illustrates an example process of extracting one or more 2-grams substrings from each of the plurality of strings.

FIG. 3 illustrates an example process of extracting one or more 2-grams substrings 300 from each of the plurality of strings 210, 220, 230, 240, 250. As shown in FIG. 3, four 2-grams substrings "st" 312, "to" 314, "or" 316, and "re" 318 are extracted from the known string "store" 210; three 2-grams substrings "co" 322, "os" 324, and "st" 326 are extracted from the known string "cost" 220; three 2-grams substrings "tr" 332, "re" 334, and "ee" 336 are extracted from the known string "tree" 230; three 2-grams substrings "aq" 342, "qr" 344, and "rp" 346 are extracted from the random string "aqrp"; and three 2-grams substrings "qr" 352, "rt" 354, and "to" 356 are extracted from the random string "qrto". The ellipsis 360 represents that there may be additional 2-gram substrings that may be extracted from the plurality of strings contained in the labeled dataset 200.

Notably, different N-grams substrings appear in the plurality of strings 200 with different frequencies. For example, as shown in FIG. 3, 2-grams substring "st" appears in both strings "store" 210 and "cost" 220; 2-grams substring "to" appears in both strings "store" 210 and "qrto" 250; 2-grams substring "re" appears in both strings "store" 210 and "tree" 230; and 2-grams substrings "qr" appears in both strings "aqrp" and "qrto". After all the plurality of strings 200 are processed to extract one or more N-grams (e.g., 2-grams) substrings, a frequency for each of the N-grams (e.g., 2-grams) substrings 300 may then be computed.

Figure 4:
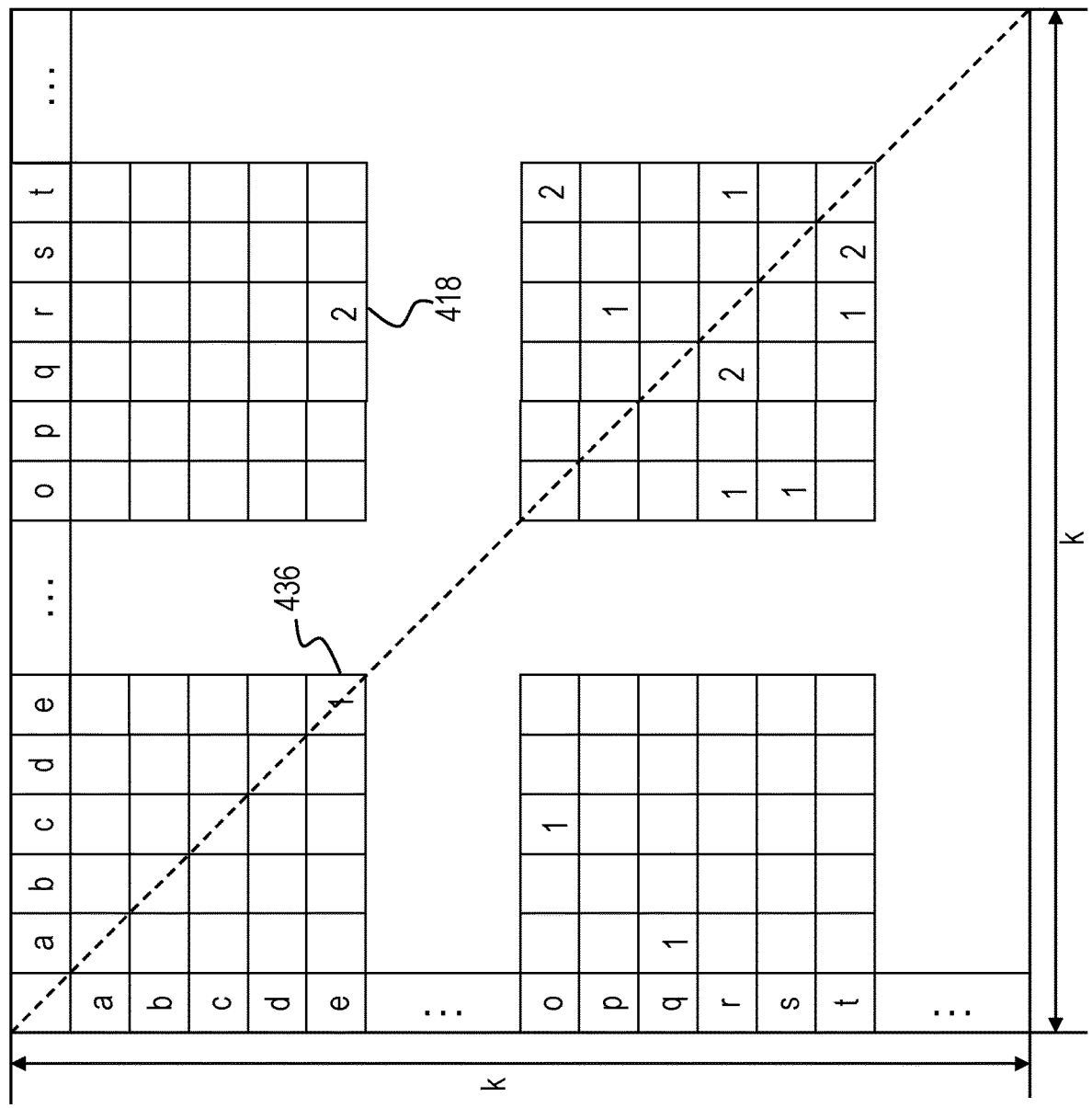
FIG. 4 illustrates a k×k chart in which an appearance frequency of each 2-grams substring can be computed and stored.

FIG. 4 illustrates an example k×k chart 400 that records the frequency of each 2-grams substrings. The horizontal axis shows a first letter in the 2-grams substrings, and the vertical axis shows a second letter in the 2-grams substrings. For example, 2-grams substring "ee" 336 is shown once in string "tree" 230; as such, the grid "ee" 436 is filled with the number "1", indicating an appearance frequency of once. As another example, 2-grams substring "re" 318, 334 are shown in both strings "store" 210 and "tree" 230; as such, the grid "re" 418 is filled with the number "2", indicating an appearance frequency of twice. Similarly, for each of the 2-grams substrings, a frequency can be determined and recorded in a corresponding grid of the k×k chart 400.

Figure 5:
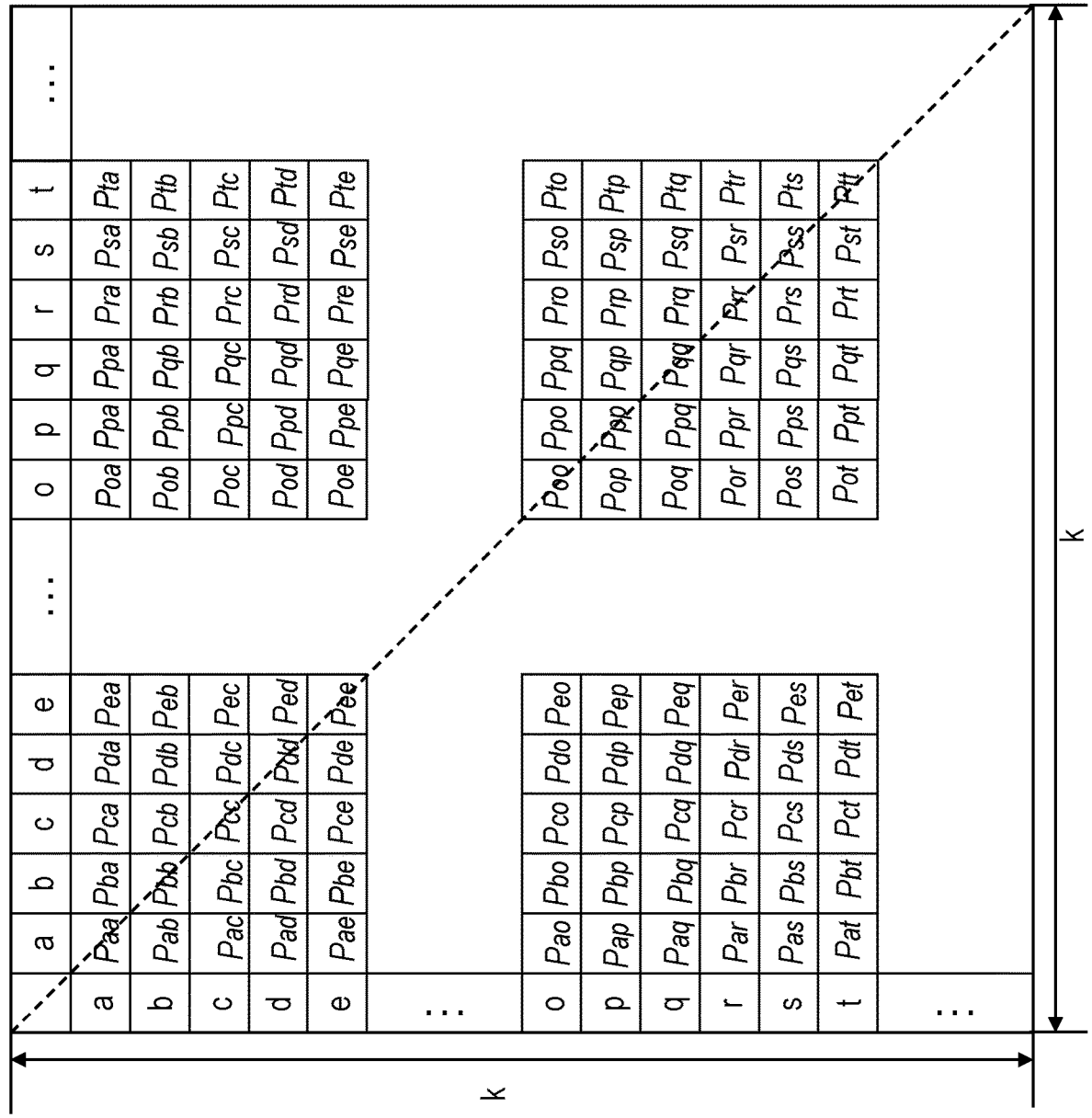
FIG. 5 illustrates a k×k chart in which a probability of each 2-grams substrings can be computed and stored.

Based on the determined frequencies of the 2-grams substrings 300, a probability $P_{ij}$ may be determined for each of the k×k 2-grams substrings 300. FIG. 5 illustrates an example k×k chart 500 that records the probability of each 2-grams substring 300. For example, $P_{aa}$ represents the probability of 2-grams substring "aa", $P_{ab}$ represents the probability of 2-grams substring "ab", $P_{ac}$ represents the probability of 2-grams substring "ac", and so on and so forth.

In some embodiments, all the characters in ASCII are counted for the 2-grams substrings. In such a case, k=128, and the k×k chart 400 or 500 is a 128×128 chart, having 16384 (=128×128) grids or combinations. In some embodiments, only a subset of most popular characters, such as English letters, numbers, and some common characters, are processed and recorded in the k×k chart 400, 500. In some embodiments, such most popular characters include about 50 characters. In such a case, k=50, the k×k chart 400 or 500 is a 50×50 chart, and 2500 (=50×50) 2-grams combinations or substrings and their corresponding frequencies are computed. The 2500 frequencies can then be used to compute 2500 probabilities for the 2500 2-grams combinations or substrings. Notably, a table of 2500 (=50×50) combinations is much smaller compared to a table of 16384 (=128×128) combinations, and a machine-learning model trained based on a 50×50 chart can generate a result more than 6 (≈16384/2500) times faster than a machine-learning model trained based on a 128×128 chart. Since the vast majority of the known strings only use the top 50 common characters, the accuracy of the machine-learning model trained based on 50×50 chart is sufficiently close to the accuracy of the machine-learning model trained based on 128×128 chart for most applications.

After the k×k probabilities of the k×k N-grams substrings are computed, an N-grams machine-learning model may be trained based on the k×k probabilities and the labeled plurality of strings. Different machine-learning techniques may be implemented to train the machine-learning model, including (but not limited to) logistic regression, k-nearest neighbors, decision trees, support vector machine, Naïve Bayes, random forest, gradient boosting, neural networks, etc.

In some embodiments, the machine-learning model is trained to identify a desired cut-off value based on entropy values of strings. In particular, each of the plurality of strings corresponds to an entropy value that measures the randomness of the string. Once the desired cut-off value is identified, the machine-learning model is configured to classify each given string as a random string or not a random string based on an entropy value of the corresponding given string. In some embodiments, the trained machine-learning model is configured to determine a normalized probability based on the entropy value of the given string. In some embodiments, the trained machine-learning model is configured to generate a binary result, such that when an entropy value of the given string is greater than the cut-off value, the string is classified as a random string.

In some embodiments, the entropy includes a Shannon's Entropy. In some embodiments, the entropy includes other metrics over n-grams probabilities. For example, when Shannon's Entropy is implemented, a higher Shannon's entropy value indicates that the string is more likely to be random. Shannon's entropy is defined in Equation (1) below:

$$H(X) = \Sigma_{i=1}^{m}(P(x_i) \log P(x_i))$$    Equation (1)

$P(x_i)$ is the probability of each N-grams substrings based on the frequency of its appearance. X is a string that includes one or more (m) N-grams substrings, where m is a natural number. In some embodiments, when a character in the N-grams substrings is not included in the k×k chart of the machine-learning model, a uniform probability of allowed k characters distribution is used. The uniform probability is defined in Equation (2) below:

$$\left(\frac{1}{k}\right)^N$$    Equation (2)

In some embodiments, the string length is also taken into account because shorter strings are less informative and deemed to be more likely to be a random string with the same entropy value compared to a longer string. In some embodiments, shorter strings are penalized via a logistic function, such that when a shorter string and a longer string correspond to a same entropy value, the shorter string is considered to be more likely to be a random string.

When the machine-learning model is a binary model configured to classify a given string as a random string or a known string, the accuracy of the machine-learning model can be tested using a testing dataset having a plurality of labeled strings. In some embodiments, the testing dataset may be the training dataset, a subset of the training dataset, a dataset that overlaps or does not overlap with the training dataset. The results of the test can be represented by a confusion matrix, including true positive results, false positive results, false negative results, and true negative results.

Figure 6:
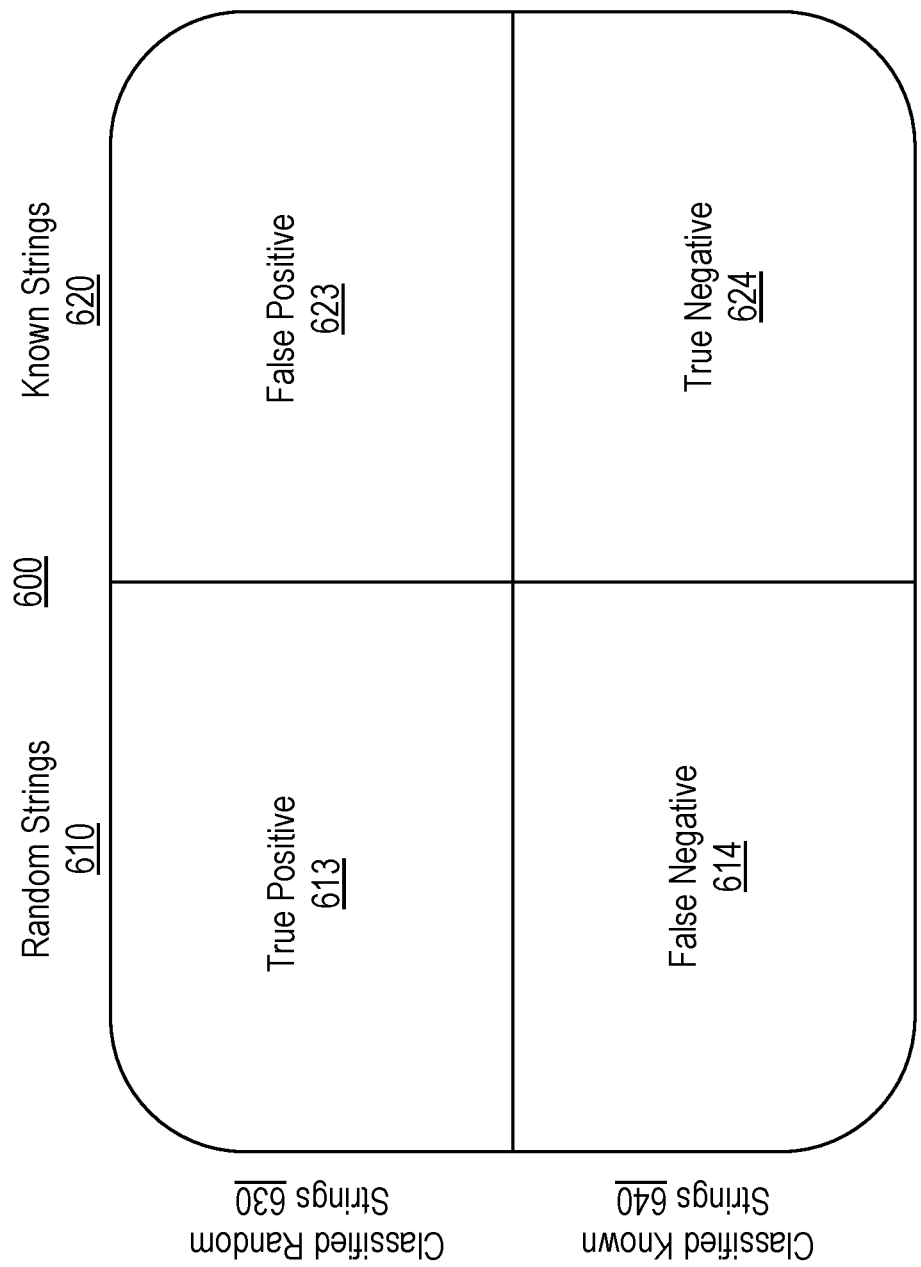
FIG. 6 illustrates a confusion matrix that can be used to represent the accuracy of a machine-learning model.

FIG. 6 illustrates an example of a confusion matrix 600. As illustrated in FIG. 6, the confusion matrix 600 includes two columns and two rows. The first column represents the strings in the testing dataset that are actually random strings 610. The second column represents the strings in the testing dataset that are actually known strings 620. The first row represents the strings in the testing dataset that are classified to be random strings 630. The second row represents the strings in the testing dataset that are classified to be known strings 640. As such, the top-left block represents true positive results 613, which include classifications of strings that are correctly predicted to be random strings. The top-right block represents false-positive results 623, which include classifications of strings that are incorrectly classified as random strings, and that are actually known strings. The bottom-left block represents false-negative results, which include classifications of strings that are incorrectly classified as known strings, and that are actually random strings. The bottom-right block represents true negative results, which include classifications of strings that are correctly classified as known strings.

Notably, when the cut-off value of the entropy value changes, the accuracy (including the true positive results 613, false positive results 623, false negative results 614, and true negative results 624) will change. Depending on the nature and need of the security agent or the application that receives the network communications (containing strings), the cut-off value can be adjusted accordingly. For example, for an identity server, security is very important; thus, the cut-off value may be selected to have a greater ratio of false positives, and a lower ratio of false negatives. If a login request includes random strings, the identity server can always notify the user, and have the user manually determine whether the login request is legitimate. As another example, an email server or application may use a different cut-off value to have a lower ratio of false positives, and a higher ratio of false negatives to ensure that the user receives all the important emails. Alternatively or in addition, multiple cut-off values may be implemented. One of the multiple cut-off values may be implemented to completely block the network communication, and another cut-off value may be implemented to generate an alert while allowing the network communication to pass through.

Note, although FIGS. 2-5 illustrate an example of using 2-grams substrings to train a machine-learning model (also referred to as a 2-grams model), the principles described herein are also applicable to N-grams substrings, where N is equal to or greater than 2. For example, when N=3, one or more 3-grams substrings are extracted from each string, a 3-dimensional matrix may be used to represent a frequency or a probability of each 3-grams substring. As another example, when N=4, one or more 4-grams substrings are extracted from each string, and a 4-dimensional matrix may be used to represent a frequency or a probability of each 4-grams substring. Generally, a greater N would result in a better accuracy at the cost of reduced performance or requiring additional computational resources.

In some embodiments, multiple machine-learning models (e.g., including a 2-grams model, a 3-grams model, etc.) are trained, and a server computing system or a client computing system may be configured to select one of the multiple machine-learning models based on their available resources or the nature of the application. For example, an email server does not require near real-time decisions; thus, a higher N-grams model may be implemented to yield a more accurate result. On the other hand, an SQL server requires near real-time decisions; thus, a 2-grams model may be implemented to yield a faster result.

In some embodiments, multiple machine-learning models are implemented simultaneously. Multiple classification results for the multiple models are combined into a single classification result to increase the accuracy. For example, in some embodiments, each classification result may be given a different weight, and a weighted classification result is used as a combined result. Alternatively, or in addition, 2-grams model is used to classify a shorter string, and a longer N-grams model is used to classify a longer string.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
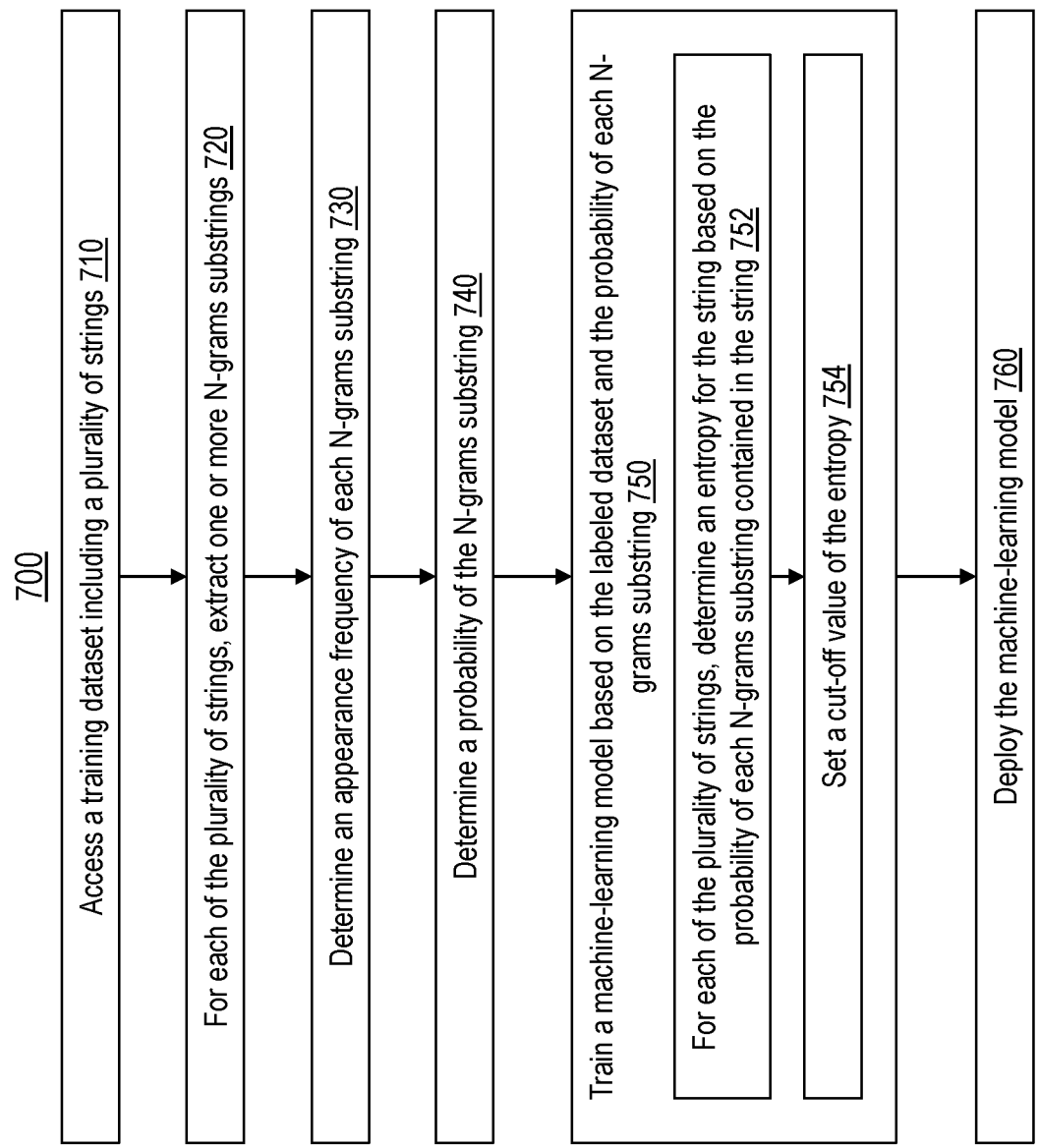
FIG. 7 illustrates a flowchart of an example method for training a machine-learning model for detecting random strings.

FIG. 7 illustrates a flowchart of an example method 700 for training a machine-learning model based on a training dataset. The method 700 may be performed by a computing system, such as training computing system 120 of FIG. 1. The method 700 includes accessing the training dataset (act 710). The training of the machine-learning model can be supervised training or unsupervised training. In some embodiments, when the training of the machine-learning model is unsupervised training, frequency of each string can be used to determine the likelihood of the corresponding string being a random string.

In some embodiments, when the training of the machine-learning model is supervised training, the training dataset is a labeled dataset, and each of the plurality of strings in the training dataset is labeled as a known string or a random string. For each of the plurality of strings, one or more N-grams substrings are extracted (act 720). Next, an appearance frequency of each N-grams substring is determined (act 730), and a probability of each N-grams substring is determined based on the determined appearance frequency of each N-grams substring (act 740).

A machine-learning model is then trained based on the training dataset and the probability of each N-grams substring (act 750). In some embodiments, act 750 further includes for each of the plurality of strings, determining an entropy value for the string based on the probability of each N-grams substring contained in the strings and the labels associated with the strings (act 752), where N is a natural number equal to or greater than 2. In some embodiments, the entropy includes a Shannon's Entropy. In some embodiments, the entropy includes other metrics over n-grams probabilities. In some embodiments, act 750 further includes setting a cut-off value of the entropy (act 754). In some embodiments, the cut-off value is set based on the accuracy requirement of an application. In some embodiments, the machine-learning model is then deployed onto one or more server computing systems and/or client computing systems (act 760), causing the server computing systems and/or the client computing systems to classify strings contained in network communications as random strings or known strings, and generate an alert in response to classifying a string as random.

Figure 8:
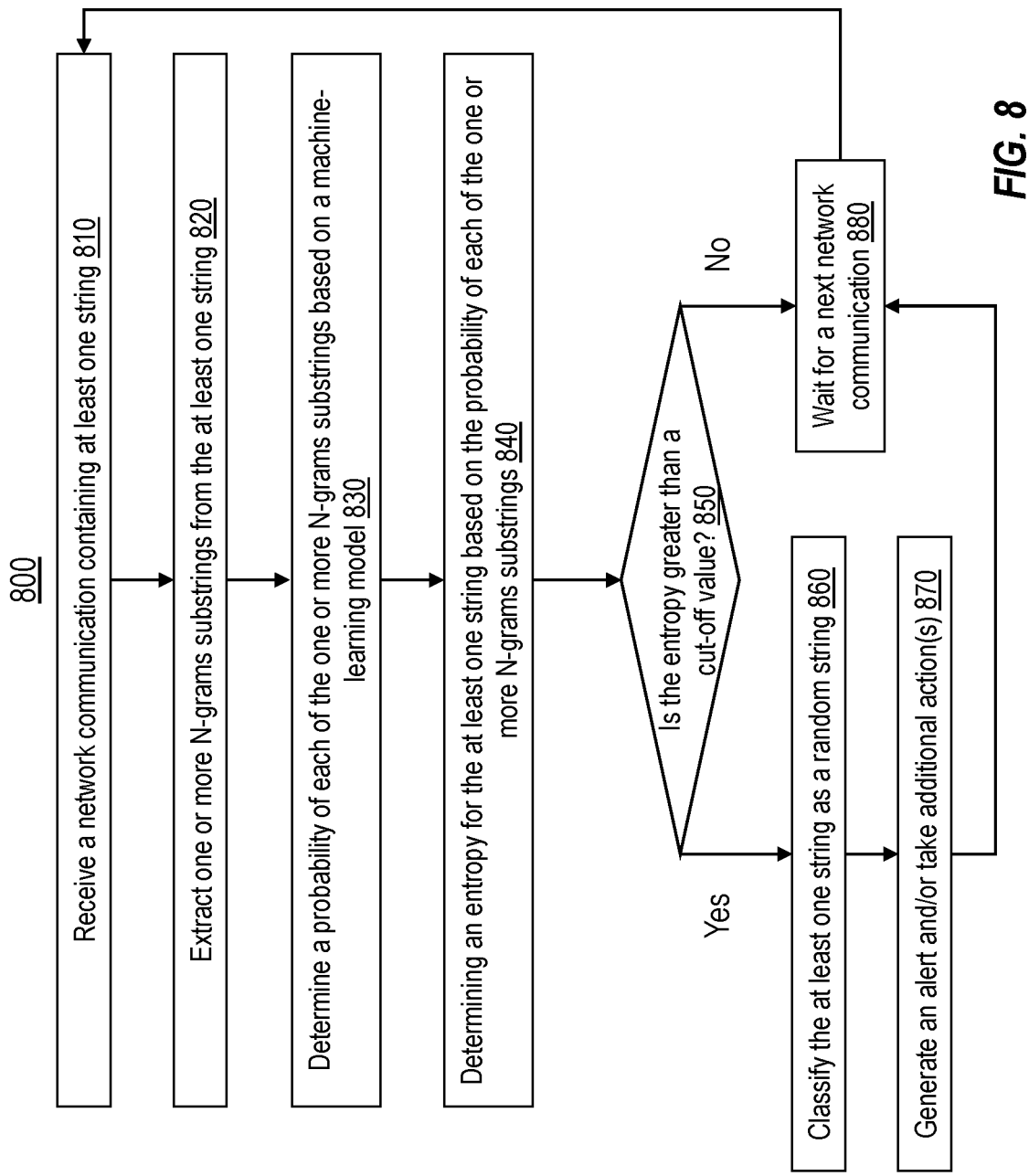
FIG. 8 illustrates a flowchart of an example method for detecting random strings and suspicious network activities using a machine-learning model.

FIG. 8 illustrates a flowchart of an example method 800 for detecting suspicious network activities using a machine-learning model (corresponding to the machine-learning model trained by the method 700 of FIG. 7). The method 800 may be performed by a computing system that executes the machine-learning model, which may be the same or different computing system that has trained the machine-learning model. The method 800 includes receiving a network communication containing at least one string (act 810) and extracting one or more N-grams substrings from the at least one string (act 820). Thereafter, a probability of each of the one or more N-grams substrings is determined based on the machine-learning model (act 830), and an entropy value is determined for the string based on the probability of each of the one or more N-grams substrings (act 840). It is then determined whether the entropy value of the at least one string is greater than a cut-off value (act 850). In response to determining that the entropy value of the at least one string is greater than the cut-off value, the at least one string is classified as a random string (act 860), and an alert is generated and/or additional actions are taken (act 870). The alert is configured to notify the computing system or a user of the computing system that a suspicious network activity is likely occurring and/or additional actions are taken to mitigate the potential damage of the suspicious network activity.

In some embodiments, the additional actions include blocking a source of the network communication temporarily or permanently. In some embodiments, the additional actions include logging metadata associated with the network communication and/or the source of the network communication for further analysis. In some embodiments, the additional actions include adding the source of the network communication to a blacklist, and distributing the blacklist among multiple computing systems.

After the alert or the proper action is taken, the computing system waits for a next network communication (act 880), and when a next network communication is received (act 810), the same acts 820, 830, 840, 850, 860, 870, 880 are performed again. This process may repeat as many times as necessary, such that the computing system is protected from suspicious network activities.

Finally, because the principles described herein may be performed in the context of a computing system (for example, each of the training computing system 120, client computing system 130, and/or server computing system 140 may include one or more computing systems) some introductory discussion of a computing system will be described with respect to FIG. 9.

Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 9:
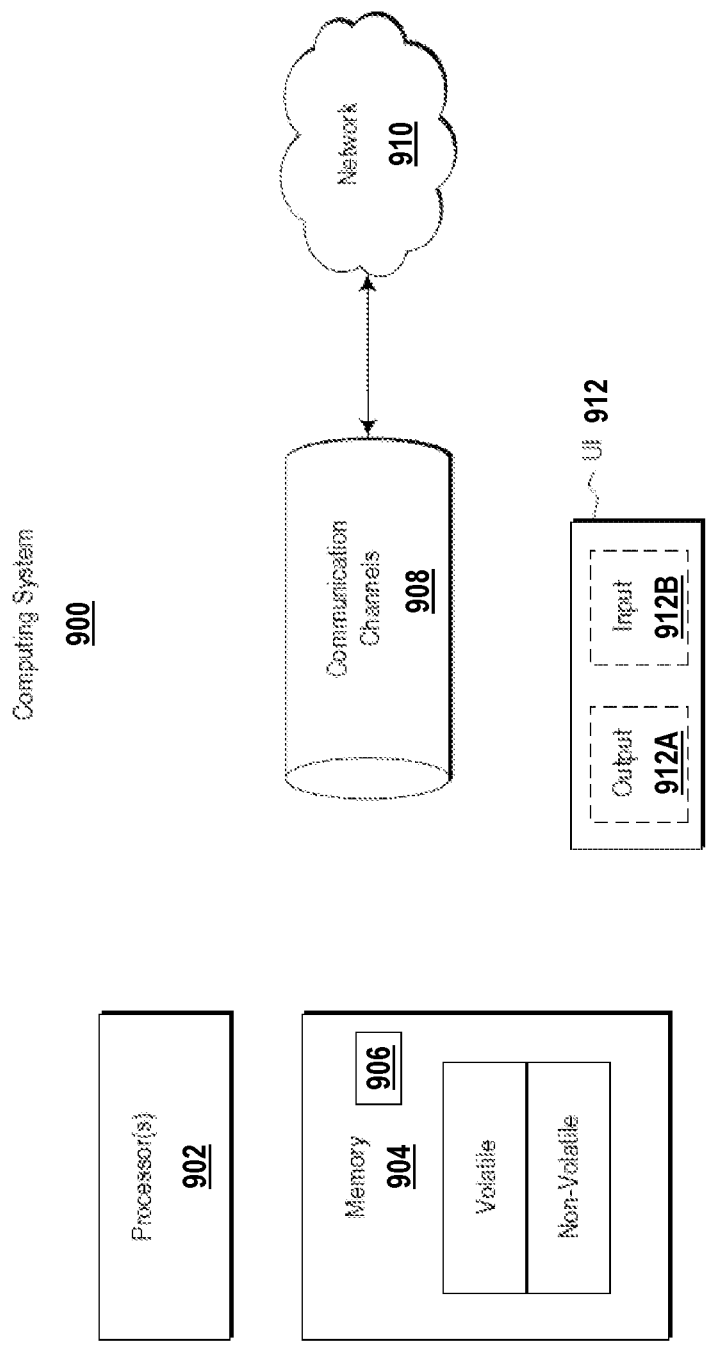
FIG. 9 illustrates an example computing system in which the principles described herein may be employed.

As illustrated in FIG. 9, in its most basic configuration, a computing system 900 typically includes at least one hardware processing unit 902 and memory 904. The processing unit 902 may include a general-purpose processor and may also include a field-programmable gate array (FPGA), an application-specific integrated circuit (ASIC), or any other specialized circuit. The memory 904 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 900 also has thereon multiple structures often referred to as an "executable component." For instance, memory 904 of the computing system 900 is illustrated as including executable component 906. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component."

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component," "agent," "manager," "service," "engine," "module," "virtual machine," or the like may also be used. As used in this description and in the case, these terms (whether expressed with or without a modifying clause) are also intended to be synonymous with the term "executable component" and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 904 of the computing system 900. Computing system 900 may also contain communication channels 908 that allow the computing system 900 to communicate with other computing systems over, for example, network 910.

While not all computing systems require a user interface, in some embodiments, the computing system 900 includes a user interface system 912 for use in interfacing with a user. The user interface system 912 may include output mechanisms 912A as well as input mechanisms 912B. The principles described herein are not limited to the precise output mechanisms 912A or input mechanisms 912B; as such will depend on the nature of the device. However, output mechanisms 912A might include, for instance, speakers, displays, tactile output, holograms, and so forth. Examples of input mechanisms 912B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmissions media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 900 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 902 and memory 904, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for training a machine-learning model for detecting random strings in network communications, comprising:
   one or more processors; and
   one or more computer-readable hardware storage media having stored thereon computer-executable instructions that are structured such that, when executed by the one or more processors, cause the computing system to perform at least:
   access a training dataset including a plurality of strings;
   for each of the plurality of strings, extract one or more N-grams substrings, wherein N is a natural number that is equal to or greater than 2;
   for each N-grams substring,
      determine an appearance frequency, which is a number of appearances of the N-grams substring, from the plurality of strings; and
      determine a probability of the N-grams substring that may occur in a string of the plurality of strings based on the appearance frequency; and
   train a machine-learning model based on the training dataset and the probability of each N-grams substring, wherein:
      when the machine-learning model is executed, the machine-learning model is configured to classify whether a given string contained in network communication is a random string; and
      in response to classifying that the given string is a random string by the machine-learning model, the machine-learning model causes an alert to be generated at a particular computing system, to which the network communication is directed, the alert notifying the particular computing system or a user of the particular computing system that a suspicious network activity is likely to occur, wherein
   the given string is obtained from network communications exchanged between a client computing system and a server computing system,
   in response to determining that the given string is a random string, the machine-learning model causes the alert to be generated at the server computing system or the client computing system, and
   the machine-learning model is deployed onto a browser of the client computing system configured to classify whether a URL is a random string, and in response to classifying that the URL is a random string, the browser is caused to block data received from the URL.

2. The computing system of claim 1, wherein the training of the machine-learning model includes supervised training, the training dataset is a labeled dataset, in which each of the plurality of strings is labeled as a known string or a random string.

3. The computing system of claim 1, wherein the training the machine-learning model comprising:
   for each of the plurality of strings, determine an entropy value for the string based on the probability of each N-grams substring contained in the string, wherein a higher entropy value indicates that the string is more likely to be a random string; and set a cut-off value of the entropy value based on an accuracy need of a particular application that performs the network communications, such that when an entropy value of the given string is greater than the cut-off value, the given string is classified as a random string.

4. The computing system of claim 3, wherein the entropy value is a Shannon's entropy value.

5. The computing system of claim 3, wherein the machine-learning model is further configured to take into account a length of the given string, such that a shorter string is penalized by a logistic function to be deemed as more likely to be a random string compared to a longer string, and such that when the shorter string and the longer string correspond to a same entropy value, the shorter string is more likely to be classified as a random string.

6. The computing system of claim 3, wherein the machine-learning model is trained to:
for each given string,
determine the entropy value for the string; and
in response to determining that the entropy value is greater than the cut-off value, determine that the given string is a random string.

7. The computing system of claim 1, wherein N=2.

8. The computing system of claim 1, wherein the one or more N-grams substrings only include substrings that contain a number of most popular characters.

9. The computing system of claim 1, wherein the given string is obtained from an input for a password or a username of the server computing system.

10. The computing system of claim 1, wherein the server computing system is an SQL server, and the given string is obtained from messages or queries exchanged between the client computing system and the SQL server.

11. The computing system of claim 1, wherein the computing system is further configured to deploy the machine-learning model to the server computing system or the client computing system, causing the server computing system or the client computing system to execute the machine-learning model to classify whether any string in communications received from the client computing system or the server computing system includes a random string.

12. The computing system of claim 1, wherein the machine-learning model is deployed onto a security module implemented at the server computing system, and the security module is configured to detect suspicious activities via the machine-learning model.

13. The computing system of claim 1, wherein the machine-learning model is deployed onto the server computing system that is an email server, or an email agent implanted at the client computing system configured to classify whether an email message contains a random string, and in response to classifying that the email message contains a random string, the email server or the email agent is configured to block the email message or filter the email message into a separate folder.

14. The computing system of claim 1, the computing system further configured to:
train a plurality of machine-learning models, each of which corresponding to a different N, and
select one of the plurality of machine-learning models to be executed based on hardware resources that are available for executing the machine-learning model.

15. A method implemented at a computing system for training a machine-learning model for detecting suspicious network activities, the method comprising:

accessing a training dataset including a plurality of strings;
for each of the plurality of strings, extracting one or more N-grams substrings, wherein N is a natural number that is equal to or greater than 2;
for each N-grams substring,
determining an appearance frequency, which is a number of appearances, of the N-grams substring, from the plurality of strings; and
determining a probability of the N-grams substring that may occur in a string of the plurality of strings based on the appearance frequency; and
training a machine-learning model based on the training dataset, wherein when the machine-learning model is executed:
the machine-learning model is configured to classify whether a given string contained in network communication is a random string; and
in response to classifying that the given string is a random string by the machine-learning model, the machine-learning model causes an alert to be generated at a particular computing system, to which the network communication is directed, the alert notifying the particular computing system or a user of the particular computing system that a suspicious network activity is likely to occur, wherein
the given string is obtained from network communications exchanged between a client computing system and a server computing system,
in response to determining that the given string is a random string, the machine-learning model causes the alert to be generated at the server computing system or the client computing system, and
the machine-learning model is deployed onto a browser of the client computing system configured to classify whether a URL is a random string, and in response to classifying that the URL is a random string, the browser is caused to block data received from the URL.

16. The method of claim 15, wherein training of the machine-learning model includes supervised training, the training dataset is a labeled dataset, in which each of the plurality of strings is labeled as a known string or a random string.

17. The method of claim 15, wherein the machine-learning model is trained to:
for each given string,
determine an entropy value for the string, wherein a higher entropy value indicates that the string is more likely to be random; and
in response to determining that the entropy value is greater than a cut-off value, determine that the given string is a random string.

18. A method for detecting suspicious network activities based on detection of random strings, the method comprising:
executing a machine-learning model trained based on a training dataset, the training dataset including a plurality of strings, wherein training the machine-learning model comprises:
for each of the plurality of strings, extracting one or more N-grams substrings, wherein N is a natural number that is equal to or greater than 2;
for each N-grams substring,
determining an appearance frequency, which is a number of appearances of the N-grams substring, from the plurality of strings; and determining a probability of the N-grams substring that may occur in a string of the plurality of strings based on the appearance frequency;

receiving network communication containing at least one string;

extracting one or more N-grams substrings from the at least one string;

determining a probability of each of the one or more N-grams substrings based on the machine-learning model;

determining an entropy value for the string based on the probability of each of the one or more N-grams substrings;

when the entropy value is greater than a cut-off value, classifying the at least one string as a random string by the machine-learning model; and in response to classifying that the at least one string is a random string,
   determining that a suspicious network activity is likely occurring; and generating an alert at a computing system, to which the network communication is directed, the alert notifying the computing system or a user of the computing system that the suspicious network activity is likely to occur, wherein the at least one string is obtained from network communications exchanged between a client computing system and a server computing system, in response to determining that the at least one string is a random string, the machine-learning model causes the alert to be generated at the server computing system or the client computing system, and the machine-learning model is deployed onto a browser of the client computing system configured to classify whether a URL is a random string, and in response to classifying that the URL is a random string, the browser is caused to block data received from the URL.

* * * * *